Aug. 1, 1950     E. T. RACHELS     2,517,348
LIVESTOCK-LOADING CHUTE
Filed July 30, 1948     4 Sheets-Sheet 1
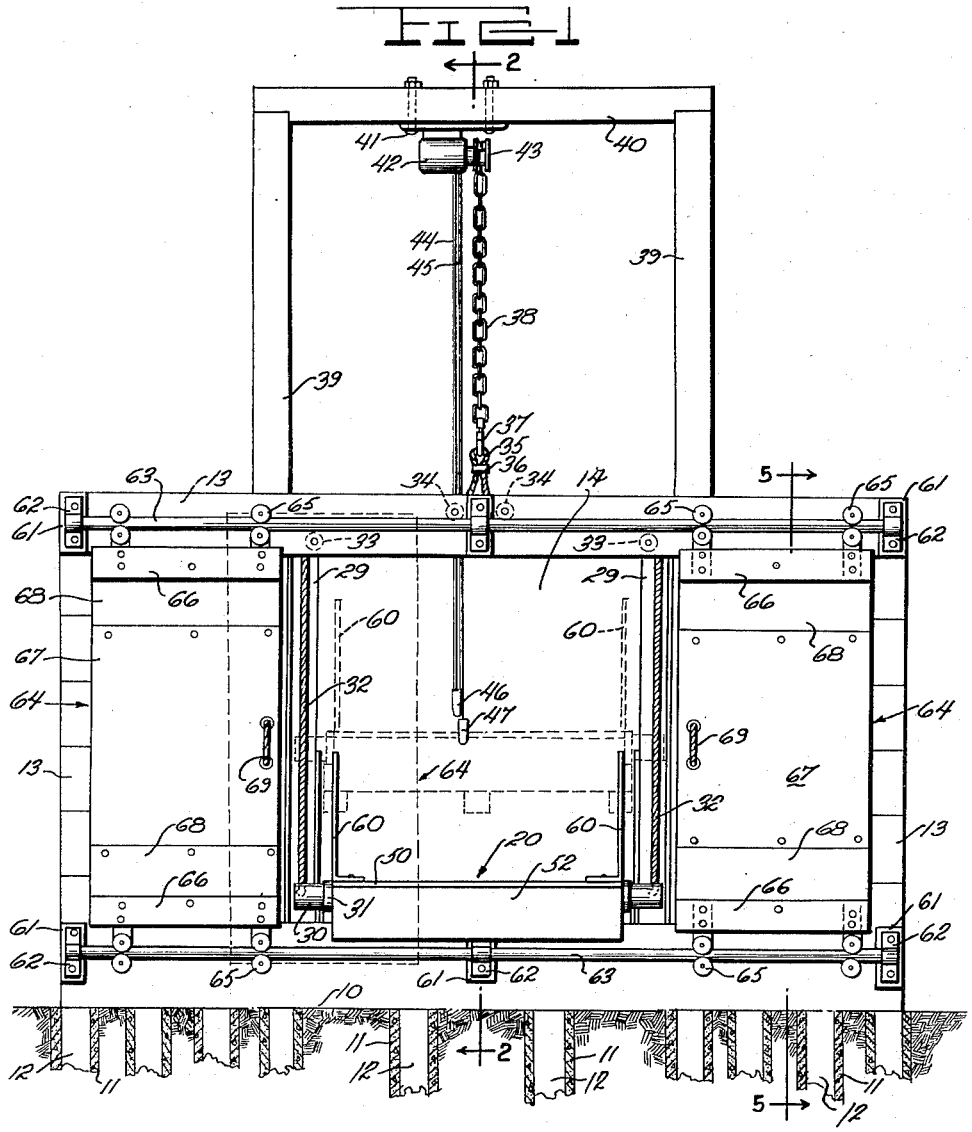
INVENTOR.
EDWARD T. RACHELS
BY
McMorrow, Berman + Davidson
ATTORNEYS

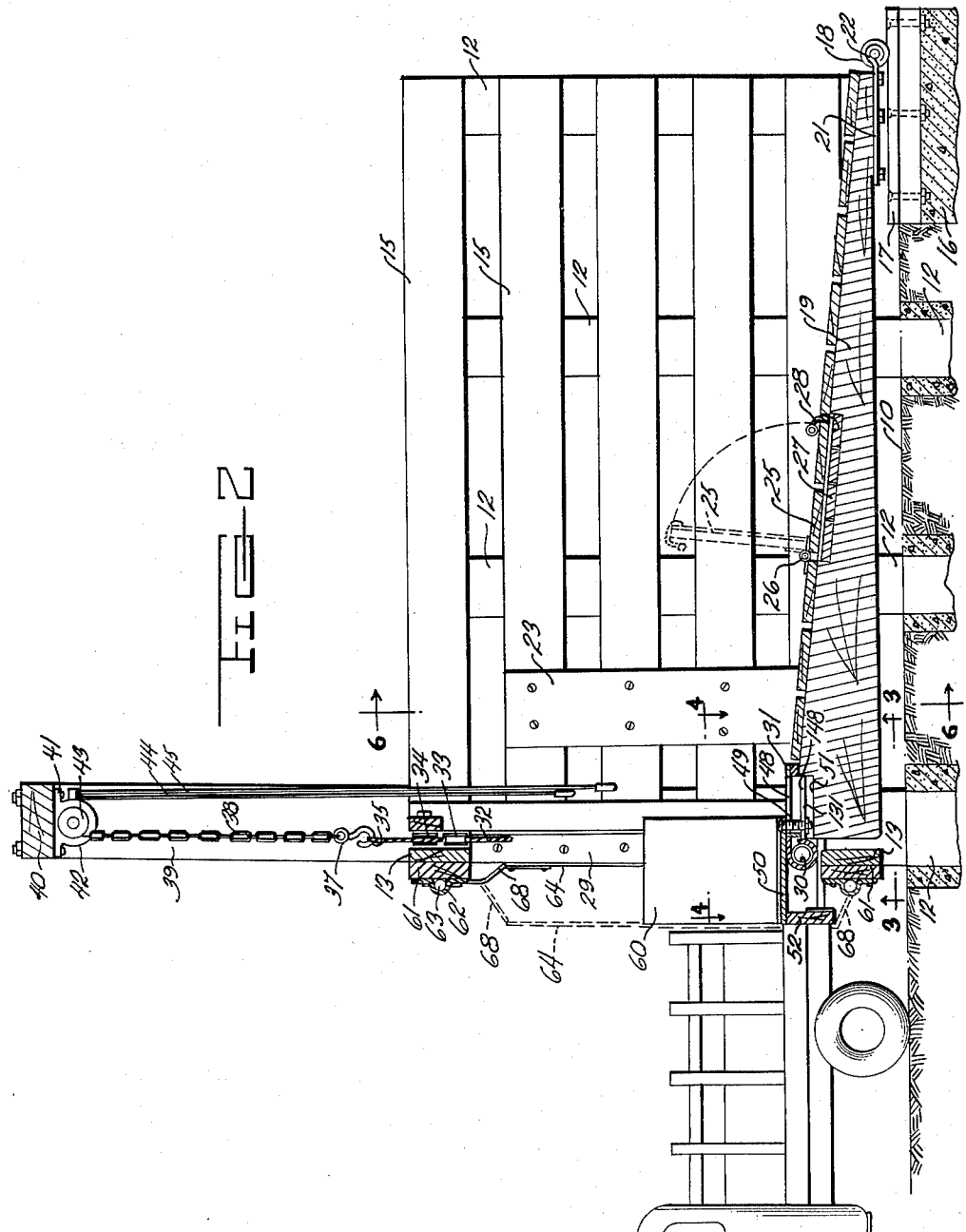

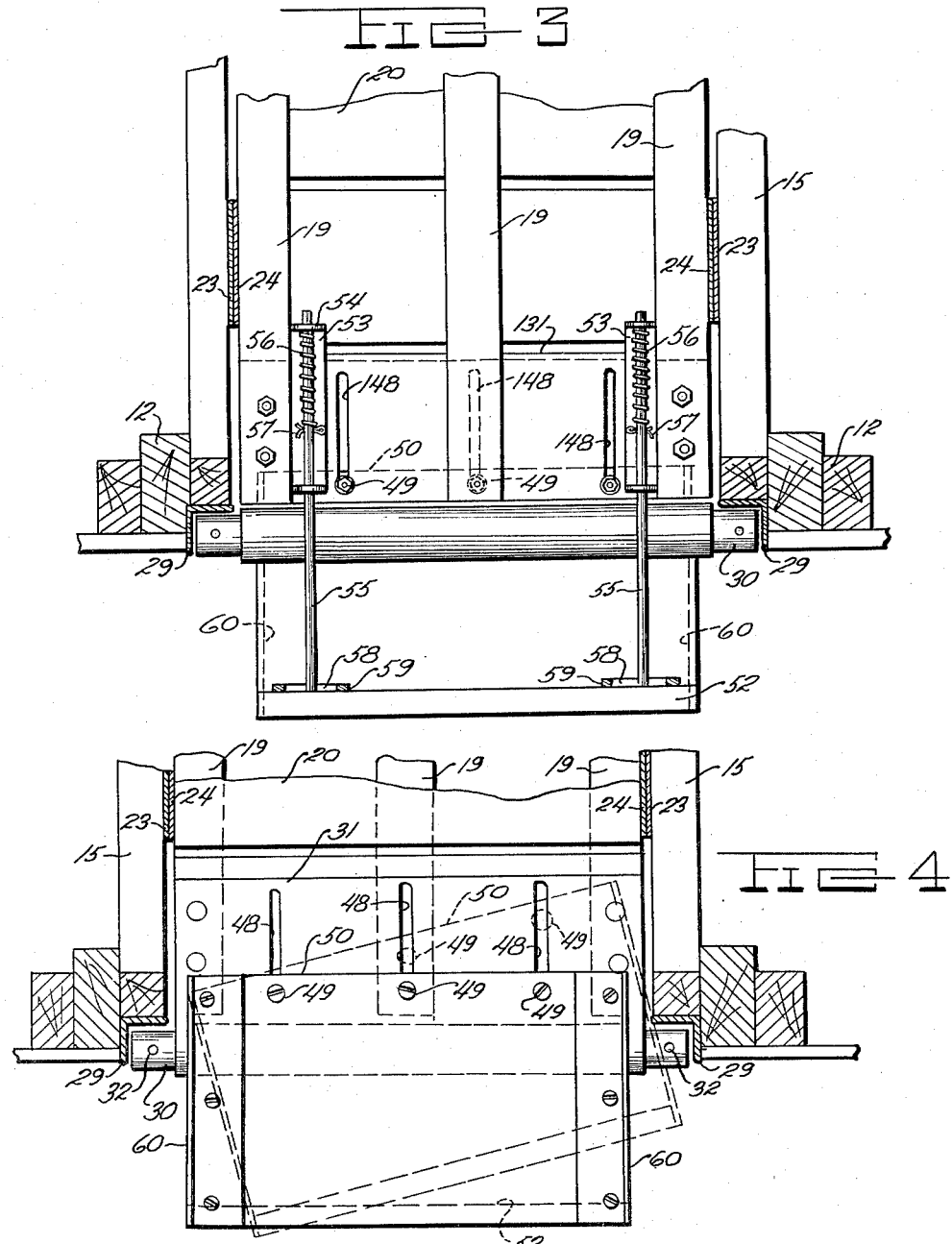

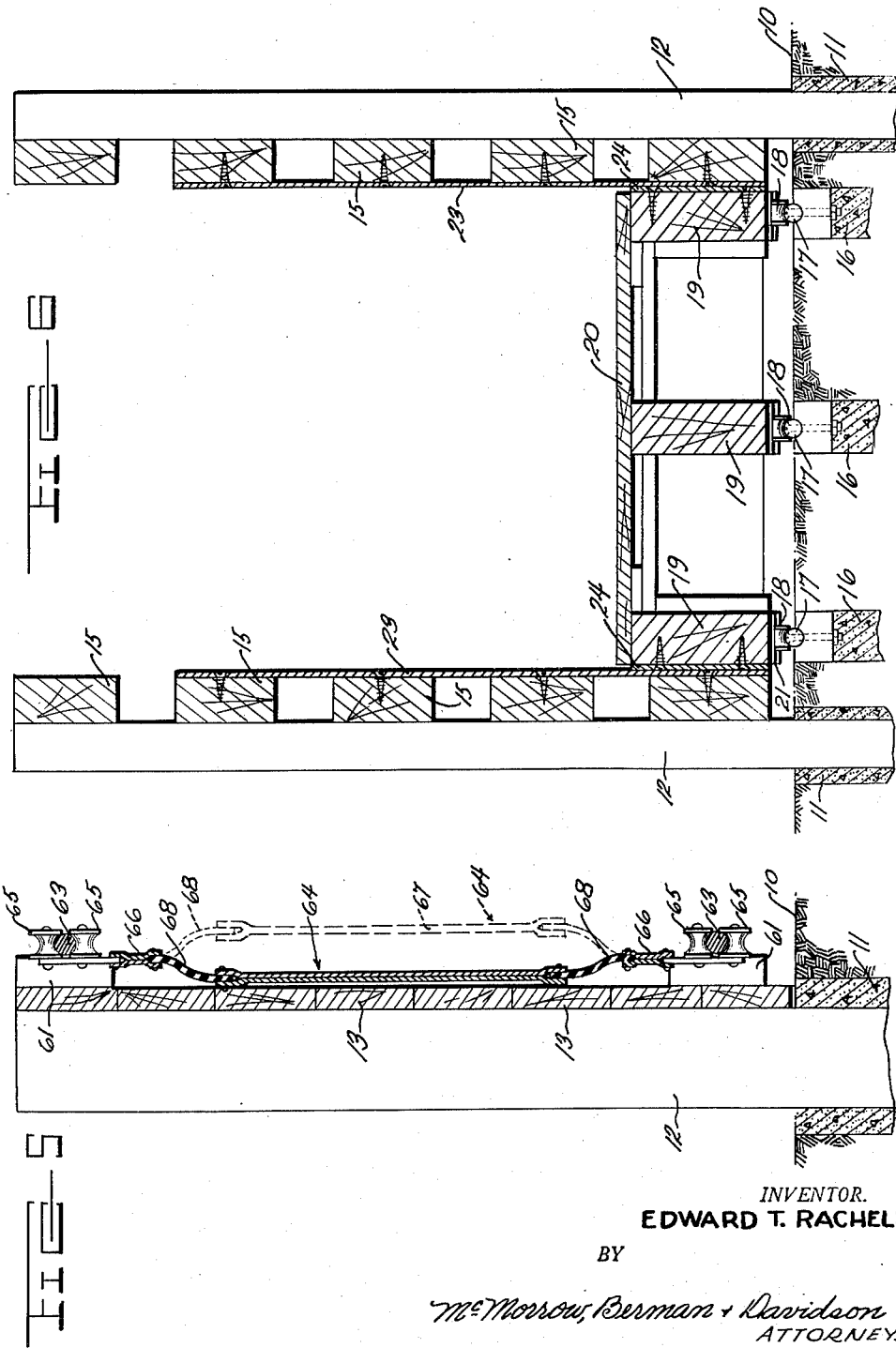

Patented Aug. 1, 1950

2,517,348

UNITED STATES PATENT OFFICE 2,517,348

LIVESTOCK-LOADING CHUTE

Edward T. Rachels, Cordele, Ga.; E. T. Rachels, Jr., administrator of said Edward T. Rachels, deceased Application July 30, 1948, Serial No. 41,616

3 Claims. (Cl. 119—82)

My invention relates to chutes for loading livestock from a barn or loading pen into a vehicle, such as a motor truck or trailer. Specifically, the loading chute according to the invention is adapted for use with vehicles having a rear end opening or door and wherein the vehicle is adapted to be backed into substantial alignment and engagement with the chute prior to loading. Obviously, the chute according to the invention is equally adapted for the unloading of such vehicles into a barn and/or a loading pen or like enclosure.

Most loading chutes now in use operate at a fixed height and have a fixed end opening whereby they will fit only those vehicles having a floor of the same height as the front end of the chute and having a door or discharge opening of the same diameter as the opening of the chute. This makes for inefficient loading and unloading of livestock, in view of the fact that there is no standard height for the floors of vehicles, nor is there any standard width for the discharge or loading openings of the same. Thus, it is extremely difficult for an operator of the vehicle to back the same into exact alignment with the opening of a chute, and, in the event that the floors of the chute and vehicle are at substantially different levels, it is necessary to use supplemental floors to eliminate the resulting step. Also, where the vehicle opening is substantially smaller than the end opening of the chute, spaces are provided on opposite sides of the end of the vehicle through which cattle may escape or fall and be injured. In addition, it is extremely difficult to back the rear end of a vehicle so that it abuts the front end of the chute flatly. However, if such flat abutment is not achieved, a wedge-shaped space is formed between the abutting floors through which the foot or leg of an animal may slip, whereby to result in a broken leg for the animal and a total loss as a salable piece of livestock.

With the foregoing in view, it is an object of my invention to provide an improved loading and unloading chute for livestock.

A further object is to provide an improved loading and unloading chute for livestock which includes an end opening at least as large as the largest end opening of a vehicle, means for varying the width of the opening of the chute, means for raising and lowering the floor of the chute to present the same flush with the floor of the vehicle, and separate actuating means for the chute floor and the means varying the size of the end opening.

A further object is to provide an improved livestock-loading and unloading chute which includes a chute floor having a free end edge, said edge being rearwardly yieldable, whereby to flatly engage the rear end of a truck backed thereagainst at an angle.

A further object is to provide an improved livestock-loading and unloading chute such as that last described which includes a floor which is raisable and lowerable to flushly engage the floor of a vehicle.

A further object is to provide in a livestock-loading and unloading chute such as that last described an end opening for said chute which is at least as large as the largest end opening of a road vehicle, and means for varying the size of said opening to conform to the size of the end opening of a vehicle.

A further object is to provide an improved livestock-loading and unloading chute which includes an oversized end opening, a pair of opposed sliding closures for varying the width of said end opening, and said closures being flexibly yieldable whereby to permit forward and rearward extension of said closures.

Other objects and advantages reside in the particular structure of the invention, combination and arrangement of the several parts thereof, and will be readily understood by those skilled in the art upon reference to the attached drawings in connection with the following specification, wherein the invention is shown, described and claimed.

In the drawings:

Figure 1 is a front elevational view of the chute according to the invention;

Figure 2 is a longitudinal vertical sectional view taken substantially on the plane of the line 2—2 of Figure 1;

Figure 3 is an enlarged horizontal section taken substantially on the plane of the line 3—3 of Figure 2;

Figure 4 is a similar section taken substantially on the plane of the line 4—4 of Figure 2;

Figure 5 is a longitudinal vertical sectional view taken substantially on the plane of the line 5—5 of Figure 1;

Figure 6 is a transverse vertical sectional view taken substantially on the plane of the line 6—6 of Figure 2.

Referring specifically to the drawings, wherein like reference characters have been used throughout the several views to designate like parts, 10 designates the plane of any suitable supporting surface, such as the ground or a barn floor. Such surface may have embedded therein any suitable foundation-providing members 11 for upright pillars or beams 12. Such uprights 12 may be of any suitable material or form, but it is understood that they are of relatively heavy and sturdy construction whereby to withstand the shocks of encounters with large trucks and/or trailer trucks or trailers. In this connection, it is understood that in maneuvering such vehicles, it frequently occurs that the rear end of the vehicle forcibly engages the front end of the chute and/or the supporting structure for the same. With this in view, it is understood that the structure of my chute and the supporting framework therefor is capable of withstanding such shocks without substantial damage to the chute or supporting structure. In practice, the uprights 12 will usually be formed of heavy timber.

In the embodiment illustrated, Figure 1, there are ten uprights 12 defining a forward wall which may be covered by any suitable planking 13, central portions of which may be cut away to define a front chute opening 14. Rearwardly of the front wall, two rows of uprights 12 are provided, Figure 2, to define a chute having a width substantially equal to that of the opening 14. Such rearwardly-extending rows of uprights 12 are connected together by planking 15 to define the chute side walls.

In view of the fact that Interstate Commerce Commission regulations provide that no road vehicle may have a width greater than 8 feet, I have formed the opening 14 with a width of at least 9 feet, whereby the same is slightly over size with respect to the largest road vehicle. Likewise, the height of the opening 14 is sufficient to accommodate the tallest road vehicle including those which have two cargo-carrying decks. In practice, I have found that the height of the opening 14 should be at least 12 feet to accomplish this purpose.

Referring now to Figures 2 and 6, it will be seen that rearwardly of the front wall of the device, the surface 10 is provided with three laterally-spaced foundation-providing bases 16 on which are mounted parallel rails 17 in any suitable manner. Such rails 17 are parallel and extend longitudinally of the chute adjacent the rear end thereof. Any suitable rollers or wheels 18 ride on the rails and such rollers are journaled on the rear ends of stringers 19 for the chute floor 20. The stringers 19 are substantially wedge shaped with the pointed ends extending rearwardly. To strengthen such relatively thin rear ends of the stringers, straps 21 of metal or the like may be secured to the under surfaces thereof and extend forwardly a sufficient distance to adequately strengthen such rear portions of the stringers. Likewise, the rear ends of the straps 21 may be extended rearwardly beyond the stringers and formed to provide eyes 22 providing journals for the wheels 18. Inasmuch as the chute floor 20 is raisable and lowerable to suit the varying floor levels of vehicles, the rollable support just described for the rear end is necessary to permit the slight forward and rearward movement of the chute floor as the same is elevated and/or lowered, respectively. To guide the chute floor as it is raised and lowered, I have provided wear plates 23 on opposite sides of the chute side walls adjacent the front end of the chute, and the abutting outer side surfaces of the outermost stringers 19 are likewise provided with wear plates 24. The abutting surfaces of the wear plates 23 and 24 may be lubricated by grease, soap or the like to insure smooth and substantially frictionless operation of the device.

Referring now to Figure 2, a central portion of the floor 20 for the chute is formed to provide a barrier 25 which is hinged to the floor by any suitable hinge means 26. The free end of the barrier 25 is formed with a flexible loop of rope or the like 28 which extends upwardly above the floor 20 to provide a hand grip for the barrier 25. A sub-floor 27 is located across the stringers 19 below the floor 20 upon which an operator may stand. The purpose of the barrier 25 is to prevent the retreat of livestock when they have passed up the chute to a point approaching the front end thereof. Thus, as soon as the animals have passed the barrier 25, the driver of the animals will grasp the hand grip 28 and raise the barrier 25 to the broken line position, Figure 2, whereby retreat of the animals down the chute is prevented. In like manner, when the animals are being unloaded into the chute from the front end, the driver of the animals may raise the barrier when they have passed the same to prevent retreat of the animals outwardly through the open end of the chute either into the vehicle which brought them or onto the ground in the event that the vehicle has driven away.

At the same time, the barrier when not being used lies flush with the floor 20 of the chute. The yielding nature of the rope or like hand grip 28 prevents the same from damaging the hoofs of the animals and likewise provides a hand grip not readily damaged by contact with the animals' hooves.

The front end of the chute floor has secured thereto a cross-bar 30 which preferably takes the form of a heavy steel pipe. As best seen in Figures 3 and 4, the ends of the cross-bar 30 extend laterally outwardly beyond the chute floor and are guided for vertical movement in a pair of substantially L-shaped metal angle rails 29 which are recessed in the intermediate uprights 12 defining the opening 14. The rails 29 not only provide guideways for the front end of the chute as the same is raised and lowered, but also reinforce the intermediate uprights 12 against shocks incident to the butting of the front end of the chute floor by the vehicle backing thereinto. Preferably, the intermediate portion of the cross-bar 30 is covered by a heavy steel plate 31 wrapped therearound and extending rearwardly over the foremost part of the chute floor 20, as clearly seen in Figures 4 and 2. The plate 31 not only reinforces the cross-bar 30, but also comprises means pivotally connecting the chute floor thereto. The rearwardly-directed portion of plate 31 overlies the planking of the floor and protects the same.

As best seen in Figures 1 and 2, the chute floor 20 is raised and lowered by means of any suitable flexible members, such as the cables 32, the free ends of which are secured to the outwardly-projected portions of the cross-bar 30. The cable 32 extends upwardly and inwardly over the outer and inner sheaves 33 and 34, respectively, carried by the topmost wall-providing plank 13. A bight portion 35 of the cable 32 extends upwardly between the innermost sheaves 34 and is secured by any suitable clamp 36 to provide an upwardly-directed eye adapted to be detachably engaged by a hook 37 of a chain or like flexible member 38.

The innermost uprights 12 are vertically extended, as at 39, and their upper ends are connected together by any suitable cross-beam 40 to which is attached by any suitable means 41 a motor 42 for a chain hoist 43. The chain hoist 43 is operatively connected to the chain 38 whereby to raise and lower the chute floor 20 as the motor 42 is driven in opposite directions. The direction of rotation of the motor 42 is controlled by an operator standing on the front end of the chute floor 20 in the opening 14. To accomplish this purpose, cables or the like 44 and 45 depend from the motor 42 to control the rotation of the same in opposite directions. The lower ends of the cables 44 and 45 may be provided with any suitable hand grips 46 and 47, respectively, which dangle within easy reach of the operator.

From the foregoing, it is apparent that irrespective of the height of the floor of the vehicle backed against the front end of the chute floor, the operator may quickly adjust the height of the chute floor to lie flush with the floor of the vehicle merely by pulling one or the other of the cables 44 or 45. A release of the cable pull automatically stops the motor and the chute floor is retained at the desired level. If desired, any suitable locking means, not shown, may be provided to lock the chute floor in an adjusted position and thereby relieve the cables 32 and chain hoist 43 of the weight of cattle passing down the chute.

As has been mentioned previously, it is extremely difficult for the driver of a vehicle to back the same squarely against the front end of a loading chute. Failure to so engage the front end of the loading chute inevitably results in a wedge-shaped crack at one side or the other of the joint between the vehicle floor and the chute floor, which crack constitutes a hazard in that livestock may break a leg therein very readily. To overcome this difficulty, I have provided a yieldable front end for the chute floor 20 which is adapted to be canted laterally in either direction upon engagement with the rear end of a vehicle backed thereagainst whereby the front end of the chute will automatically seat flatly against the rear end of a vehicle floor when the same is urged thereagainst at an angle. Thus, the objectionable crack between the chute floor and the vehicle floor is eliminated, while, at the same time, the driver of the vehicle need not make repeated attempts to back the same squarely or flatly against the front end of the chute. Thus, the loading and unloading of livestock is expedited to a great extent by this feature now to be described.

As best seen in Figures 3 and 4, the forward end of the chute floor and the cover plate 31 therefor are provided with parallel and laterally-spaced slots 48. A similar plate 131 underlies and reinforces the foremost floor boards of the chute floor 20 and is formed with slots 148 registering with the slots 48. A steel plate 50 of slightly lesser width than the chute floor 20 is slidable atop the front end thereof and includes a front edge extending forwardly of the front edge of the chute floor. Spaced studs or the like 49 depend from the plate 50 and are freely slidable in slots 48. The diameter of the studs 49 is substantially smaller than the width of the slots 48 to permit the free sliding and canting of the plate 50. In the case of the central slot 48, the upper surface of the intermediate stringer 19 may be provided with a groove in alignment with the center slot 48 to receive the depending lower end of the stud or bolt 49. Such groove is indicated at 51 in Figure 2. The forward end of the plate 50 is preferably formed with a depending heavy duty flange 52 providing a buffer bar for engagement with the rear end of the floor of a vehicle backed thereagainst. As is readily apparent, in Figure 4, when a vehicle is backed against the buffer bar 52 at a slight angle to the same, the bar and plate 50 will be canted laterally so that the bar 52 flatly engages the rear end of the vehicle floor. At the same time, the plate and bar will yield rearwardly as a unit. Resiliency is imparted to the plate 50 and buffer bar 52 by means now to be described. The under surface of the front end of the floor 20, Figure 3, has mounted thereon in laterally-spaced parallel relation a pair of inverted U-shaped guide-providing members 53, the depending ears 54 thereof being apertured to slidably receive the rear ends of a pair of push rods 55. Any suitable coil springs 56 surround the push rods 55 between the ears 54 and such springs are substantially heavy duty and load the push rods 55 for forward movement by virtue of any suitable cross-abutments 57 provided through the push rods and bearing against the forward ends of the springs 56. The rear ends of the springs 56 bear against the rearmost ears 54 of the guides 53. The forward ends of the push rods 55 bear against the inner surface of the bar 52 and are guided for lateral movement thereon in slots 58 which are in lateral alignment and formed in plates 59 secured to the inner surface of the bar 52. Thus, as the plate 50 and bar 52 are canted from the full line position to the broken line position, Figure 4, the forward ends of the push rods 55 slide laterally against the inner surface of the bar 52 in the slots 58. Upon release of pressure on the plate 50 and push bar 52, the springs 56 return the assembly to the full line position of Figure 4. Obviously, if it happens that the vehicle backs squarely against the extension of the chute floor, the same will provide a buffer and will yield rearwardly until the bar 52 bears against the front surface of the cross-bar 39. By providing the width of the plate 50 as slightly less than the diameter of the opening 14, the lateral canting of the plate is permitted. To prevent the escape of animals laterally off the plate 50 when the same is projected beyond the front end of the chute floor, the outer ends of the plate 50 have been provided with vertically-directed flanges 60 or wall-providing portions which extend vertically above the plate 50 a substantial distance. I have found that it is preferable that such flanges 60 extend vertically at least 4 feet.

From the foregoing, it is obvious that there has been provided a chute which includes a floor adjustable to fit the height of the floor of any vehicle with which the device is adapted to be used and in which the width of the front chute opening is at least as great or greater than that of the rear opening in the widest vehicle with which the chute is adapted to be used. Likewise, it is apparent that there has been provided means for adjusting the front end of the chute so as to fit flatly against a vehicle rear end presented thereto at an angle. However, in the event that the device is used with a vehicle having a width substantially less than that of the chute opening, it is obvious that in the absence of compensating structure, lateral openings will be formed on the front end of the chute at either side of the vehicle. With this in view, means now to be described have been provided to adjust the width of the chute opening to conform to the width of any vehicle with which the chute is adapted to be used.

Means for accomplishing this purpose are best seen in Figures 1, 2 and 5. Such means comprise upper and lower rails 63 which are horizontally-disposed above and below the opening 14 for the chute. Such rails are preferably mounted by any suitable means 62 to the front faces of spacer blocks 61, whereby the rails 63 are forwardly spaced from the front frame of the device. The rails 63 provide upper and lower tracks for a pair of sliding doors, generally indicated at 64. Such doors 64 are provided with upper and lower rollers or like anti-friction devices which ride upon the rails 63. Each pair of rollers 65 comprises a truck which is secured to any suitable rigid top frame member 66 for each door 65. In like manner, each truck riding on the lowermost rail 63 is secured to a rigid bottom frame member 66 for each door 64. To enable the doors to be forwardly extensible so as to overlie the front surface of the buffer bar 52 when the same is projected forwardly, the doors are preferably made flexible in any suitable manner. Thus, in the embodiment illustrated, the central portion of each door 64 is formed of a substantially rigid panel 67 and connected to the top and bottom members 66 of the doors by flexible top and bottom frame members 68. Such members 68 may comprise textile or rubber or any rubber-like material, whereby they are flexible and/or resilient. The provision of a flexible door has an additional advantage in that it permits the door to yield rearwardly when struck by a truck body as the same is backed against the chute. In such an event, the rigid central panel portion 67 is forced rearwardly against the planks 13 to lie flatly thereagainst, whereby the panel is undamaged by the shock of its encounter with the vehicle body. Any suitable flexible handles, such as the rope handles 69, may be provided on the inner edges of the doors 64, whereby an operator may readily pull them inwardly into abutment with the sides of a vehicle whereby to reduce the lateral dimensions of the opening 14 to a size substantially equal to that of the vehicle.

It follows from the foregoing that the chute provided by the structure heretofore described is readily and quickly adjusted to fit the width, height, floor level and angle of approach of any vehicle with which the same is adapted to be used. Moreover, the adjustment of the chute opening 14 to fit the opening of a vehicle is accomplished quickly with a minimum of operation of the parts, and with a minimum of maneuvering of the vehicle. At the same time, the structure of the chute and the associated parts is such that there is little likelihood of their being damaged when rammed by a truck rear end, whereby the device according to the invention is strong and sturdy and long lived in use. While I have shown and described by way of an example a specific embodiment of the invention, it is obvious that the same is susceptible of other forms and expressions. Consequently, I do not limit myself to the precise structure shown and described hereinabove except as hereinafter claimed.

I claim:

1. In a livestock-loading chute open at the front end thereof and including a floor for level disposition with the floor of an end-loading vehicle, a horizontal plate on the front end of said floor being formed with transversely spaced apart longitudinal slots therein, a second plate slidable on said first plate, bolts engaging through said latter plate loosely engaging in said slots slidably and rockably securing said plates together and resilient means engaging between said plates biasing said movable plate in extended relation with said first plate and said floor.

2. In a livestock-loading chute open at the front end thereof and including a floor for a level disposition with the floor of an end-loading vehicle, a horizontal plate on the front end of said floor being formed with transversely spaced apart longitudinal slots thereon, a second plate slidable on said first plate, means engaging through said latter plate and loosely engaging said slots slidably and rockably securing said plates together and resilient means engaging between said plates biasing said movable plate in extended relation with the first plate and said floor, whereby to press said movable plate to assume a complementary angle and flatly engage said vehicle rear end.

3. In a livestock-loading chute open at the front end thereof and including a floor for level disposition with the floor of an end-loading vehicle, a horizontal plate on the front end of said floor being formed with transversely spaced apart longitudinal slots therein, a second plate slidable on said first plate, members on said latter plate loosely engaging in said slots slidably and rockably securing said plates together, resilient means engaging between said plates biasing said movable plate in extended relation with said first plate and said floor, providing a rearwardly-yieldable free front edge for said floor, said edge being adapted to be laterally inclined upon engagement with a vehicle rear end presented thereto at an angle, whereby to assume a complementary angle and flatly engage said vehicle rear end, said yieldable front free edge including vertical flanges cooperating with the side walls of said chute to provide side wall extensions.

EDWARD T. RACHELS.

REFERENCES CITED

The following references are of record in the file of this patent:

UNITED STATES PATENTS

| Number | Name | Date |
|---|---|---|
| 155,868 | Hart | Oct. 13, 1874 |
| 377,519 | Ferguson | Feb. 7, 1888 |
| 379,146 | Yoakum | Mar. 6, 1888 |
| 409,222 | McIver | Aug. 20, 1889 |
| 799,868 | Ray | Sept. 19, 1905 |
| 933,089 | Martin | Sept. 7, 1909 |
| 1,045,009 | Elsner | Nov. 19, 1912 |
| 1,131,783 | Howard | Mar. 16, 1915 |
| 2,279,572 | Kann | Apr. 14, 1942 |
| 2,372,574 | Haynes | Mar. 27, 1945 |